(12) United States Patent
Cui et al.

(10) Patent No.: US 10,712,087 B2
(45) Date of Patent: Jul. 14, 2020

(54) REFRIGERATING DEVICE FOR PREPARING FROZEN DRINK

(71) Applicant: SANHUA(HANGZHOU) MICRO CHANNEL HEAT EXCHANGER CO., LTD., Hangzhou (CN)

(72) Inventors: Kai Cui, Hangzhou (CN); Dong Zhou, Hangzhou (CN); Weide Chen, Hangzhou (CN); Linjie Huang, Hangzhou (CN); Bi Xie, Hangzhou (CN)

(73) Assignee: SANHU(HANGZHOU) MICRO CHANNEL HEAT EXCHANGER CO., LTD., Hangzhou (CN)

( * ) Notice: Subject to any disclaimer, the term of this patent is extended or adjusted under 35 U.S.C. 154(b) by 530 days.

(21) Appl. No.: 15/360,548

(22) Filed: Nov. 23, 2016

(65) Prior Publication Data
US 2017/0146289 A1 May 25, 2017

(30) Foreign Application Priority Data

Nov. 25, 2015 (CN) .......................... 2015 1 0827609

(51) Int. Cl.
*F25D 11/00* (2006.01)
*F25D 31/00* (2006.01)
(Continued)

(52) U.S. Cl.
CPC ........... *F25D 31/002* (2013.01); *A23G 9/045* (2013.01); *B67D 1/0858* (2013.01); *F25B 5/02* (2013.01);
(Continued)

(58) Field of Classification Search
CPC ....... A23G 9/045; F25D 31/002; F25D 41/00; B67D 1/0858; F25B 5/005
(Continued)

(56) References Cited

U.S. PATENT DOCUMENTS 3,319,436 A * 5/1967 Wilch ..................... F25C 1/147
62/68
4,655,050 A 4/1987 Aschberger et al.
(Continued)

FOREIGN PATENT DOCUMENTS

CN 85107026 A 4/1987
CN 102589220 A 7/2012
(Continued)

OTHER PUBLICATIONS

Communication dated May 8, 2017 enclosing the partial European search report dated Apr. 25, 2017 issued by the European Patent Office for European Application No. 16199168 (15 pages).
(Continued)

*Primary Examiner* — Elizabeth J Martin
*Assistant Examiner* — Nael N Babaa
(74) *Attorney, Agent, or Firm* — Howard & Howard Attorneys PLLC

(57) ABSTRACT

A refrigerating device used to reduce a temperature of drinks is provided and a higher refrigerating efficiency can be obtained through a control method and a control system thereof. The refrigerating device includes a pre-refrigeration unit used to pre-refrigerate a raw material; a main-refrigeration unit in communication with the pre-refrigeration unit and used to accommodate the pre-refrigerated raw material and refrigerate the raw material further; a dispenser in communication with the main-refrigeration unit and used to dispense the frozen drink in the main-refrigeration unit; and a refrigeration system providing a refrigerating capacity to the pre-refrigeration unit and the main-refrigeration unit.

8 Claims, 4 Drawing Sheets

(51) Int. Cl.
*F25B 41/04* (2006.01)
*F25D 19/00* (2006.01)
*F25B 23/00* (2006.01)
*F25B 5/02* (2006.01)
*A23G 9/04* (2006.01)
*B67D 1/08* (2006.01)
*F25D 11/02* (2006.01)
*F25D 21/06* (2006.01)

(52) U.S. Cl.
CPC ............ *F25B 23/006* (2013.01); *F25B 41/04* (2013.01); *F25D 11/006* (2013.01); *F25D 11/022* (2013.01); *F25D 19/00* (2013.01); *F25D 21/065* (2013.01); *F25B 2600/2511* (2013.01)

(58) Field of Classification Search
USPC .......................................................... 62/335
See application file for complete search history.

(56) References Cited

U.S. PATENT DOCUMENTS

| | | | |
|---|---|---|---|
| 4,907,417 A | 3/1990 | Forsythe | |
| 6,553,779 B1 | 4/2003 | Boyer et al. | |
| 2002/0007637 A1 | 1/2002 | Simmons et al. | |
| 2006/0260371 A1* | 11/2006 | Williams | E05B 27/00 70/493 |
| 2008/0149655 A1* | 6/2008 | Gist | A23G 9/045 221/1 |
| 2009/0260371 A1* | 10/2009 | Kuehl | F25B 25/005 62/79 |
| 2014/0290303 A1* | 10/2014 | Shin | F25D 17/065 62/419 |
| 2015/0253067 A1* | 9/2015 | Bucceri | B65D 85/78 62/66 |

FOREIGN PATENT DOCUMENTS

| | | |
|---|---|---|
| CN | 203928531 U | 11/2014 |
| GB | 2099979 A | 12/1982 |
| GB | 2099979 B | 8/1984 |

OTHER PUBLICATIONS

Communication dated Sep. 26, 2017 enclosing the extended European Search Report dated Sep. 18, 2017 for European Application No. 16199168.

First Office Action for Chinese Patent Application No. 201510827609.0 dated Apr. 30, 2019.

* cited by examiner

US 10,712,087 B2

REFRIGERATING DEVICE FOR PREPARING FROZEN DRINK

CROSS-REFERENCE TO RELATED APPLICATION

This application claims priority to and benefits of Chinese Patent Application Serial No. 201510827609.0, filed with the State Intellectual Property Office of P. R. China on Nov. 25, 2015, the entire content of which is incorporated herein by reference.

FIELD

The present disclosure relates to a field of refrigerating technology, and specifically, to a refrigerating device used to prepare a frozen drink.

BACKGROUND

Frozen drinks such as an ice cream, a smoothie or a slush drink meet different tastes for consumers especially in summer, and are becoming more and more popular with the consumers. In the related art, a refrigerating device used to prepare the frozen drinks includes an evaporator, a compressor, a condenser, a throttling element and so on, in which the raw material (for example, one of water, a dry power ingredient, a solution ingredient, a mixer of water and the dry power ingredient and a mixer of water and the solution ingredient) used to prepare the frozen drinks is refrigerated to form the frozen drinks in one step via the evaporator. With the method for preparing the frozen drinks, the compressor is demanded to start and stop frequently, which influences a service life of the compressor, adds the energy consumption, in addition, time for refrigeration is long as the raw material is refrigerated to form the frozen drink in one step, which influences a taste of the frozen drinks, and a control of the refrigerating device is complicated.

SUMMARY

The present disclosure aims to solve at least one of the technical problems in the related art to at least some extent.

Thus, the present disclosure provides a refrigerating device having a high refrigerating efficiency and low energy consumption.

The refrigerating device according to embodiments of the present disclosure, including: a pre-refrigeration unit used to pre-refrigerate a raw material for preparing the frozen drink in the pre-refrigeration unit; a main-refrigeration unit in communication with the pre-refrigeration unit and used to accommodate the pre-refrigerated raw material, in which the pre-refrigerated raw material is refrigerated further in the main-refrigeration unit; a dispenser in communication with the main-refrigeration unit and used to dispense the frozen drink in the main-refrigeration unit; a refrigeration system providing a refrigerating capacity to the pre-refrigeration unit and the main-refrigeration unit so as to pre-refrigerate the raw material in the pre-refrigeration unit and further refrigerate the pre-refrigerated raw material in the main-refrigeration unit to form the frozen drink.

In one embodiment, the refrigeration system provides the refrigerating capacity to the pre-refrigeration unit and the main-refrigeration unit indirectly via a cool storage material unit.

In one embodiment, the refrigeration system includes an evaporator, the cool storage material unit includes an evaporator cool storage material unit covering the evaporator, a pre-refrigeration cool storage material unit covering at least a portion of the pre-refrigeration unit, and a main-refrigeration cool storage material unit covering the main-refrigeration unit; the evaporator cool storage material unit is in communication with the pre-refrigeration cool storage material unit via a first heat pipe so that the first heat pipe transfers the refrigerating capacity of the evaporator cool storage material unit to the pre-refrigeration cool storage material unit, and the evaporator cool storage material unit is in communication with the main cool storage material unit via a second heat pipe so that the second heat pipe transfers the refrigerating capacity of the evaporator cool storage material unit to the main-refrigeration cool storage material unit.

In one embodiment, the raw material is configured to be one of water, a dry power ingredient, a solution ingredient, a mixer of water and a dry power ingredient and a mixer of water and a solution ingredient, the pre-refrigeration unit includes a water pre-refrigeration chamber and a preservation chamber used to storage the dry power ingredient and/or the solution ingredient, the main-refrigeration unit includes a main-refrigeration chamber, and the water pre-refrigeration chamber and the preservation chamber are in communication with the main-refrigeration chamber via a pipe; the refrigeration system provides the refrigerating capacity to the water pre-refrigeration chamber, the preservation chamber and the main-refrigeration chamber respectively so as to pre-refrigerate the water in the water pre-refrigeration chamber, pre-refrigerate the dry power ingredient and/or the solution ingredient in the preservation chamber, and further refrigerate the pre-refrigerated water as well as the dry power ingredient and/or the solution ingredient in the main-refrigeration chamber.

In one embodiment, at least one of the water pre-refrigeration chamber and the main-refrigeration chamber is constituted by a portion of a water inlet pipe used for supplying water.

In one embodiment, the refrigeration system includes a compressor, a condenser, a throttling element, a first evaporator used to provide the refrigerating capacity to the water pre-refrigeration chamber, a second evaporator used to provide the refrigerating capacity to the main-refrigeration chamber and a third evaporator used to provide the refrigerating capacity to the preservation chamber.

In one embodiment, the first evaporator is covered with a first evaporator insulating layer externally, and a first evaporator cool storage material unit is disposed in the first evaporator insulating layer; the second evaporator is covered with a second evaporator insulating layer externally, and a second evaporator cool storage material unit is disposed in the second evaporator insulating layer; at least a portion of an outer wall of the water pre-refrigeration chamber is covered with a water pre-refrigeration insulating layer, a water pre-refrigeration chamber cool storage material unit is disposed in the water pre-refrigeration insulating layer, the refrigerating capacity is transferred between the water pre-refrigeration chamber cool storage material unit and the first evaporator cool storage material unit via the first heat pipe; and at least a portion of an outer wall of the main-refrigeration chamber is covered with a main-refrigeration insulating layer, a main-refrigeration chamber cool storage material unit is disposed in the main-refrigeration insulating layer, the refrigerating capacity is transferred between the main-refrigeration chamber cool storage material unit and the second evaporator cool storage material unit via the second heat pipe.

In one embodiment, the first evaporator is covered with a first evaporator insulating layer externally, and a first evaporator cool storage material unit is disposed in the first evaporator insulating layer; the second evaporator is covered with a second evaporator insulating layer externally, and a second evaporator cool storage material unit is disposed in the second evaporator insulating layer; the third evaporator is covered with a third evaporator insulating layer externally, and a third evaporator cool storage material unit is disposed in the third evaporator insulating layer; at least a portion of an outer wall of the water pre-refrigeration chamber is covered with a water pre-refrigeration insulating layer, a water pre-refrigeration chamber cool storage material unit is disposed in the water pre-refrigeration insulating layer, the refrigerating capacity is transferred between the water pre-refrigeration chamber cool storage material unit and the first evaporator cool storage material unit via the first heat pipe; at least a portion of an outer wall of the main-refrigeration chamber is covered with a main-refrigeration insulating layer, a main-refrigeration chamber cool storage material unit is disposed in the main-refrigeration insulating layer, and the refrigerating capacity is transferred between the main-refrigeration chamber cool storage material unit and the second evaporator cool storage material unit via the second heat pipe; and at least a portion of an outer wall of the preservation chamber is provided with a preservation insulating layer, a preservation chamber cool storage material unit is disposed in the preservation insulating layer, and the refrigerating capacity is transferred between the preservation chamber cool storage material unit and the third evaporator cool storage material unit via the third heat pipe.

In one embodiment, a plurality of the preservation chambers is provided, and various kinds of the dry power ingredient and/or the solution ingredient are pre-refrigerated in the plurality of the preservation chambers respectively and correspondingly.

In one embodiment, a water inlet valve is disposed at a water inlet of the water pre-refrigeration chamber, an ingredient electric regulating valve is disposed at the pipe between the preservation chamber and the main-refrigeration chamber, and a frozen drink electric regulating valve is disposed at an outlet pipe between the dispenser and the main-refrigeration chamber.

In one embodiment, an ice scraper is disposed in the outlet pipe and used to scrap ice attached to an inner wall of the outlet pipe.

In one embodiment, the ice scraper includes an impeller-agitator rotatably disposed in the outlet pipe and an electric motor used to drive the impeller-agitator.

In one embodiment, the refrigerating device further includes an air intake device used to bring air into the main-refrigeration chamber.

In one embodiment, the air intake device includes an air pump and an air communicating pipe in communication with the main-refrigeration chamber, and the air pump brings environmental air or an artificial air source into the main-refrigeration chamber via the air communicating pipe.

In one embodiment, a first regulating valve is disposed between the throttling element and the first evaporator, a second regulating valve is disposed between the throttling element and the second evaporator, and a third regulating valve is disposed between the throttling element and the third evaporator.

DETAILED DESCRIPTION

Figure 1:
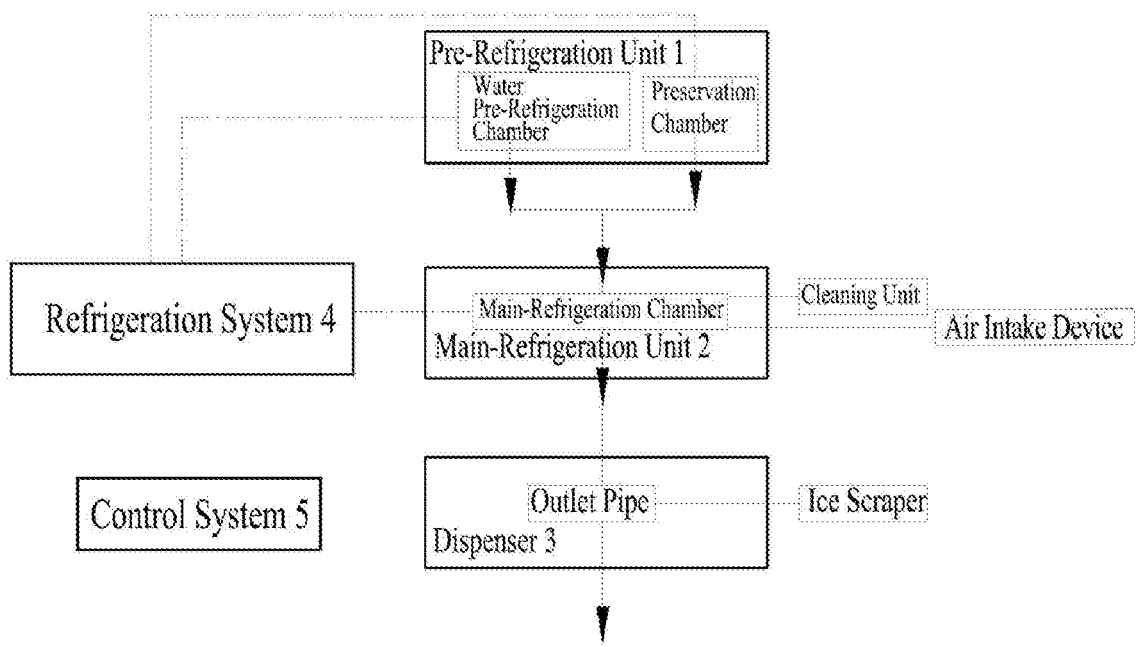
FIG. 1 is a modular schematic view of a refrigerating device of the present disclosure.

Embodiments of the present disclosure will be described in detail in the following. Examples of the embodiments are shown in the drawings. The embodiments described herein with reference to drawings are explanatory, and used to generally understand the present disclosure, and shall not be construed to limit the present disclosure.

The refrigerating device according to embodiments of the present disclosure is used to reduce a temperature of a liquid for drinking to a set range so that the frozen drink is made from the liquid for drinking, for example, the refrigerating device according to embodiments of the present disclosure can be used to prepare drinks in a smoothie or slush form and also used to cool wine, water, juice or other fluid food. In embodiments of the present disclosure, the raw material used to prepare the frozen drink may be one of water, a dry power ingredient, a solution ingredient, a mixer of water and a dry power ingredient and a mixer of water and a solution ingredient according to different frozen drinks to be prepared, in which the dry power ingredient may be one or a plurality of kinds of fruit powders and the solution ingredient may be one or a plurality of kinds of juices, ingredients and so on.

Figure 2:
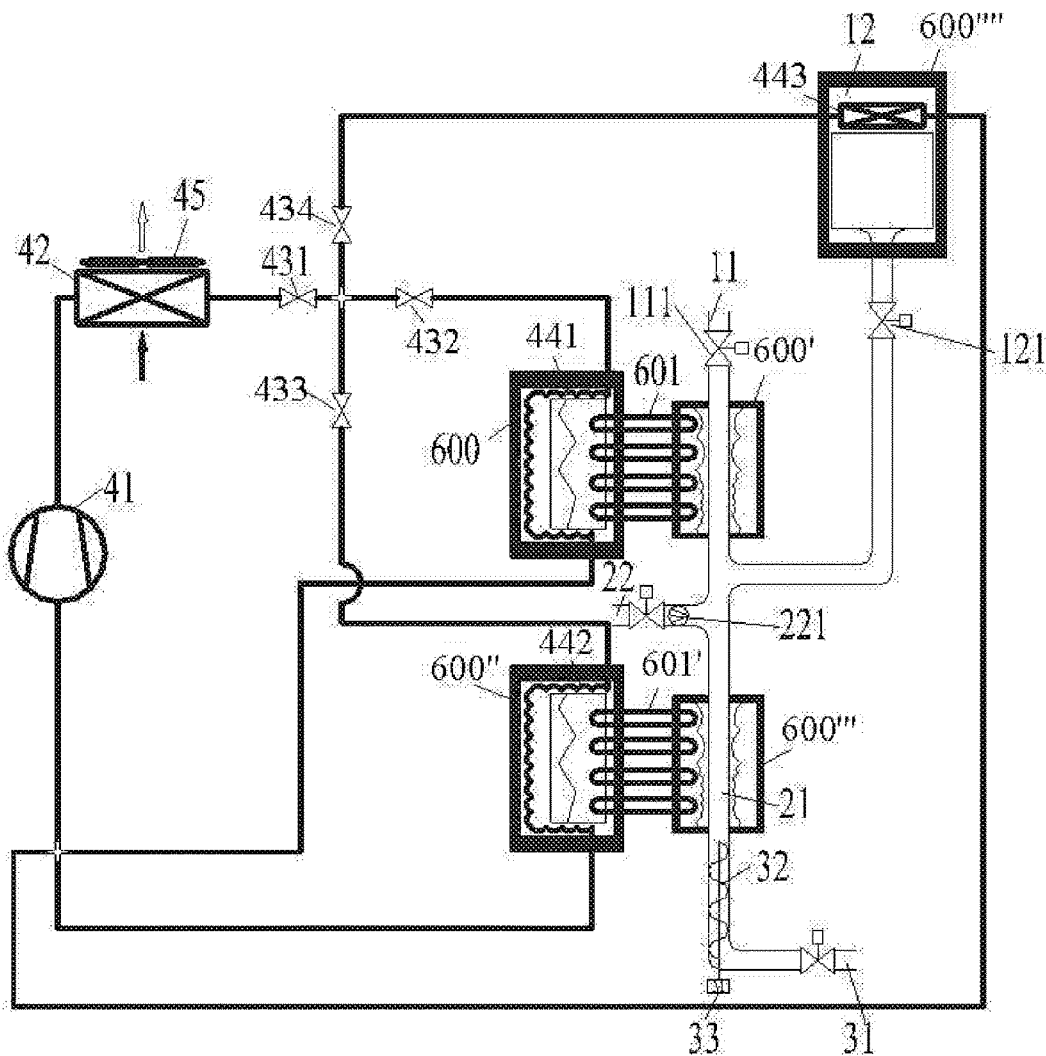
FIG. 2 is a schematic view of a system of a refrigerating device of the present disclosure.

With reference to FIGS. 1 to 2, the refrigerating device includes a pre-refrigeration unit, a main-refrigeration unit 2, a dispenser 3, a refrigeration system 4 and a control system 5. The raw material is refrigerated preliminary in the pre-refrigeration unit 1, and then enters the main-refrigeration unit 2 to be refrigerated further, when a preset temperature is arrived, a solution forms a smoothie drink in a semi-frozen liquid state, and a dispenser can be opened to lead the smoothie drink to a receiving end for drinking if a user needs.

The pre-refrigeration unit 1 includes a water pre-refrigeration chamber 11 and a preservation chamber 12 used to storage the dry power ingredient and/or the solution ingredient, in which the water pre-refrigeration chamber 11 can be configured as a water inlet pipe. The water pre-refrigeration chamber 11 is provided with a water inlet and a water inlet valve 111 to lead drinking water in. The water inlet valve 111 may be configured to be an electric regulating valve so as to control a turn-on/turn off state of the water pre-refrigeration chamber 11 and regulate a flow quantity of an inflow of water. The preservation chamber 12 is configured to be a cavity, the dry power ingredient and/or the solution ingredient can be positioned in the cavity, the dry power ingredient and/or the solution ingredient may be packaged in bulk or in a box, and the raw material of the drinks can be selected freely according to different users' taste demands. One or a plurality of the preservation chambers may be provided, each of the preservation chambers may be provided with many kinds of dry power ingredients and/or the solution ingredients packaged in box, and each of the preservation chambers also may be provided with one kind of dry power ingredient and/or the solution ingredient packaged in bulk or in the box.

The main-refrigeration unit 2 includes a main-refrigeration chamber 21, and the water pre-refrigeration chamber 11 and the preservation chamber 12 are both in communication with the main-refrigeration chamber 21 via a pipe. An electric regulating valve 121 is disposed at the pipe between the preservation chamber 12 and the main-refrigeration chamber 21 so that a turn-on/turn off state and a flow quantity of the dry power ingredient and/or the solution ingredient from the preservation chamber to the main-refrigeration chamber 21 can be controlled and regulated. A shape of the main-refrigeration chamber 21 is not defined specifically, which may be a cavity having a larger central portion, an end provided with an inlet for receiving a solution coming from the pre-refrigeration unit 1, and another end provided with an outlet to make the solution enter the dispenser 3; and the main-refrigeration chamber 21 may also be a pipe structure having a consistent diameter up and down as shown in FIG. 2.

The dispenser 3 includes an outlet pipe 31 in communication with the main-refrigeration chamber 21, the outlet pipe 31 is provided with an outlet valve 311 and a water outlet, and the outlet valve 311 may be configured to be an electric regulating valve so as to control a turn-on/turn off state of the outlet pipe 31 and regulate a flow quantity.

A refrigerating capacity demanded by the pre-refrigeration unit 1 and the main-refrigeration unit 2 is provided by the refrigeration system 4, to be precise, an evaporator in the refrigeration system 4 provides the refrigerating capacity to the water pre-refrigeration chamber 11, the preservation chamber 12 and the main-refrigeration chamber 21. The refrigeration system 4 includes a compressor 41, a condenser 42, a first evaporator 441, a second evaporator 442 and a third evaporator 443, a fan 45 disposed correspondingly to the condenser 42, and a throttling assembly, in which the throttling assembly includes a throttling element 431, a first regulating valve 432, a second regulating valve 433 and a third regulating valve 434. An outlet of the compressor 41 is in communication with an inlet of the condenser 42, an outlet of the condenser 42 is in communication with an inlet of the throttling element 431, an outlet of the throttling element 431 is in communication with inlets of the first regulating valve 432, the second regulating valve 433 and the third regulating valve 434 respectively, an outlet of the first regulating valve 432 is in communication with an inlet of the first evaporator 441 (i.e. the first regulating valve 432 is disposed at a flow path between the outlet of the throttling element 431 and the inlet of the first evaporator 441), an outlet of the second regulating valve 433 is in communication with an inlet of the second evaporator 442 (i.e. the second regulating valve 433 is disposed at a flow path between the outlet of the throttling element 431 and the inlet of the second evaporator 442), an outlet of the third regulating valve 434 is in communication with an inlet of the third evaporator 443 (i.e. the third regulating valve 434 is disposed at a flow path between the outlet of the throttling element 431 and the inlet of the third evaporator 443), and outlets of the first evaporator 441, the second evaporator 442 and the third evaporator 443 are in communication with an inlet of the compressor 41 respectively. The first regulating valve 432 can control a circulation of a refrigerant between the outlet of the throttling element 431 and the inlet of the first evaporator 441, the second regulating valve 433 can control a circulation of a refrigerant between the outlet of the throttling element 431 and the inlet of the second evaporator 442, and the third regulating valve 434 can control a circulation of a refrigerant between the outlet of the throttling element 431 and the inlet of the third evaporator 443.

The throttling element 431 can throttle, reduce pressure, and further regulate a flow quantity of the refrigerant in the refrigerant flow paths between the outlet of the condenser 42 and the inlets of the first evaporator 441, the second evaporator 442 and the third evaporator 443. The first regulating valve 432, the second regulating valve 433 and the third regulating valve 434 may be configured as flow quantity regulating valves and can regulate refrigerant flow quantities of the three refrigerant flow paths respectively or turn on and turn off the communication of the refrigerant, and certainly, the first regulating valve 432, the second regulating valve 433 and the third regulating valve 434 may also be configured as switching valves used to turn on or turn off the communication of the refrigerant in the refrigerant flow paths between the outlet of the condenser and the inlets of the first evaporator 441, the second evaporator 442 and the third evaporator 443. Specifically, the throttling element 431 may be configured to be an electronic expansion valve, a thermostatic expansion valve or a capillary tube, the first regulating valve 432, the second regulating valve 433 and the third regulating valve 434 may be solenoid valves having a fully closing function, and the electronic expansion valve and the solenoid valves can receive a control signal provided by the control system 5 and realize respective specific regulation according to the control signal. The refrigerating device includes a temperature sensor used to detect a temperature of the evaporator, and the refrigerating device controls throttling element's regulation according to the temperature of the evaporator detected by the temperature sensor.

The third evaporator 443 is disposed in the cavity of the preservation chamber 12 and provides refrigerating capacity to the preservation chamber 12 so as to preserve the dry power ingredient and/or the solution ingredient packaged in bulk or in box in the preservation chamber 12 and pre-refrigerate them to a preset temperature, and when the preset temperature is arrived, the third regulating valve 434 can be closed in the control of the control system 5. The first evaporator 441 is covered with a first evaporator insulating layer 600 externally, and a first evaporator cool storage material unit is disposed in the first evaporator insulating layer 600. At least a portion of an outer wall of the water pre-refrigeration chamber is covered with a water pre-refrigeration insulating layer 600', a water pre-refrigeration chamber cool storage material unit is disposed in the water pre-refrigeration insulating layer 600', and the refrigerating capacity is transferred between the water pre-refrigeration chamber cool storage material unit and the first evaporator cool storage material unit via a first heat pipe 601. The second evaporator 432 is covered with a second evaporator insulating layer 600'' externally, and a second evaporator cool storage material unit is disposed in the second evaporator insulating layer 600''. At least a portion of an outer wall of the main-refrigeration chamber is covered with a main-refrigeration insulating layer 600''', a main-refrigeration chamber cool storage material unit is disposed in the main-refrigeration insulating layer 600''', and the refrigerating capacity is transferred between the main-refrigeration chamber cool storage material unit and the second evaporator cool storage material unit via a second heat pipe 601'. When the refrigeration system operates, the refrigerating capacity produced by the first evaporator 441 can be transferred to the water pre-refrigeration chamber cool storage material unit in the water pre-refrigeration insulating layer 600' via the first heat pipe 601 so as to storage the refrigerating capacity, the refrigerating capacity produced by the second evaporator 442 can be transferred to the main-refrigeration chamber cool storage material unit in the main-refrigeration insulating layer 600''' via the second heat pipe 601' so as to storage the refrigerating capacity, which can reduce a loss of the refrigerating capacity, and realize an effective use of the refrigerating capacity, prevent the compressor from being started and stopped frequently and prolong its service life. Certainly, the third evaporator 443 may also be covered with a third evaporator insulating layer externally, and a third evaporator cool storage material unit is disposed in the third evaporator insulating layer. At least a portion of an outer wall of the preservation chamber is provided with a preservation insulating layer 600'''', a preservation chamber cool storage material unit is disposed in the preservation insulating layer 600'''', and the refrigerating capacity is transferred between the preservation chamber cool storage material unit and the third evaporator cool storage material unit via a third heat pipe.

An operation mode of the refrigerating device is introduced below. When the raw material is water, the water enters the water pre-refrigeration chamber 11 to be refrigerated preliminary at first, then pre-refrigerated water enters the main-refrigeration chamber 21 to be refrigerated further to form a frozen drink, and lastly the frozen drink is dispensed into a container for a user to drink through the dispenser 3. When the raw material is the solution ingredient, the solution ingredient is stored in the preservation chamber 12 for pre-refrigeration, then enters the main-refrigeration chamber 21 to be refrigerated further to form a frozen drink, and lastly the frozen drink is dispensed into the container for the user to drink through the dispenser 3. When the raw material is a mixer of the water and the dry power ingredient, the water and the dry power ingredient are pre-refrigerated in the water pre-refrigeration chamber 11 and the preservation chamber respectively, then enters the main-refrigeration chamber 21 to be refrigerated further to form a frozen drink, and lastly the frozen drink is dispensed into the container for the user to drink through the dispenser 3. Certainly, the raw material may also be the dry power ingredient or a mixer of water and the solution ingredient, which will not be described in detail here.

In order to make the water and the ingredients mixed uniformly, and also make the smoothies drink full of bubbles to produce a better taste, the main-refrigeration chamber 21 is further provided with an air intake device. The air intake device may be an air communicating pipe 22 in communication with the main-refrigeration chamber 21, the air communicating pipe 22 is provided with an air pump 221 which can bring environmental air or an artificial air source into the main-refrigeration chamber 21. Certainly, an inlet may be designed as a nozzle having a small aperture so as to inject an air flow into the main-refrigeration chamber 21, which has a better effect. Or the air communicating pipe 22 may be provided with a solenoid valve to control the opening and closing of the air communicating pipe 22. In addition, the air communicating pipe 22 may also be disposed on a pipe between where the water and the other ingredients converge and the main-refrigeration chamber 21, which will not be described in detail here.

In addition to the air communicating pipe 22 introduced above, the air intake device may also be an air communicating hole disposed in the main-refrigeration chamber 21 through which the environmental air can enter the main-refrigeration chamber 21, which will not be repeated here.

The refrigerating device further includes a cleaning unit used to clean the main-refrigeration chamber, the water pre-refrigeration chamber 11 mentioned above serves as a water entering passage of the cleaning unit and the outlet pipe 31 of the smoothie drinks mentioned above serves as a water draining passage of the cleaning unit.

When the solution turns to a smoothie state, ice will be attached to an inner pipe wall of the main-refrigeration chamber 21 or/and the outlet pipe 31, and an ice scraper may be disposed in the outlet pipe 31 to scrap the attached ice. The ice scraper includes an impeller-agitator 32 which is rotatably disposed in the outlet pipe 31 and has a rotational central axis coincident with an axis of the outlet pipe 31, and in addition, the impeller-agitator 32 can extend from the outlet pipe 31 to the main-refrigeration chamber 21, the impeller-agitator 32 has an end provided with an electric motor 33 used to drive the impeller-agitator 32 to rotate, and the electric motor 33 can receive a control signal provided by the control system 5.

Figure 3:
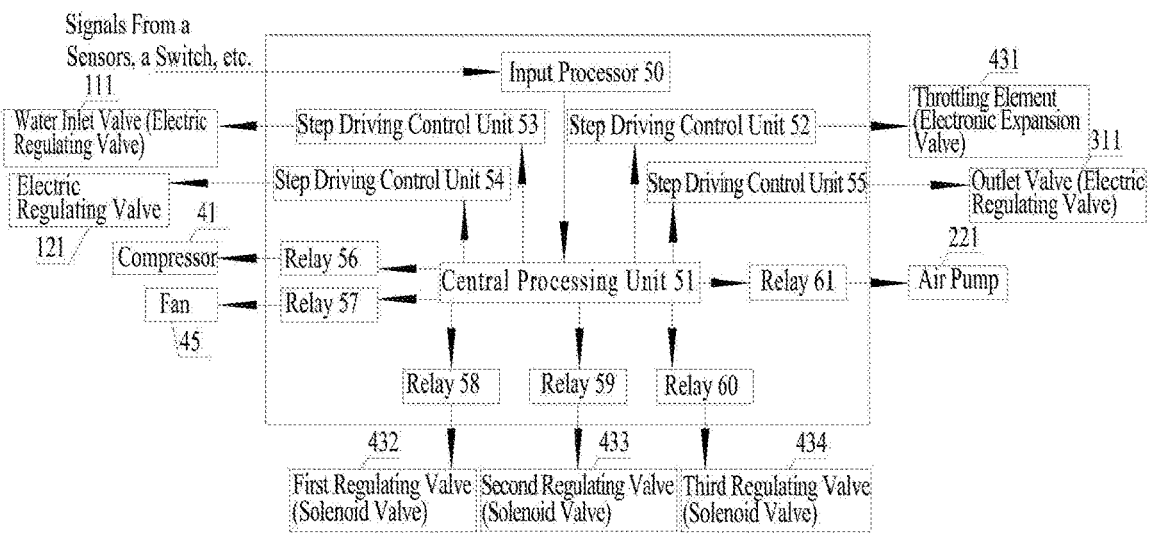
FIG. 3 is a schematic view of a control system of the present disclosure.

As shown in FIG. 3, the control system 5 used to control the refrigerating device includes a central processing unit 51 which can provide the control signal to the refrigerating device, the compressor 41, the fan 45 and the throttling element can be controlled through the control signal provided by the central processing unit. As shown in FIG. 3, the throttling element 431 is configured to be an electronic expansion valve, and the first regulating valve 432, the second regulating valve 433 and the third regulating valve 434 are all configured to be solenoid valves. The control system further includes relays 56, 57 disposed corresponding to the compressor 41 and the fan 45. Specifically, in an embodiment shown in FIG. 3, a step driving control unit 52 may be disposed corresponding to the throttling element 431 (the electronic expansion valve), step driving control units 53, 54, 55 may be disposed corresponding to the electric regulating valve 121, the water inlet valve 111 and the outlet valve 311 respectively, relays 58, 59, 60 may be disposed corresponding to the first regulating valve, the second regulating valve and the third regulating valve respectively, a relay 61 may be disposed corresponding to the air pump 221, and a relay may be disposed corresponding to the electric motor 33.

The central processing unit 51 can receive an input signal and/or a temperature sensor signal via an input processor 50, and then generate and send control signals for the compressor 41, the fan 45, the air pump 221 and the electric motor 33 to the respective relays, generate and send a control signal for the throttling element (the electronic expansion valve) 431 to the step driving control unit 52 above, generate and send control signals for the first regulating valve 432, the second regulating valve 433 and the third regulating valve 434 to corresponding relays; or generate and send control signals for the water inlet valve 111, the electric regulating valve 121, the outlet valve 311 to the respective step driving control units 53, 54, 55.

Or, the central processing unit 51 can receive and analyze control information coming from an outer controller via the input processor 50, and send analyzed control signals used to control the compressor 41, the fan 45, the air pump 221 and the electric motor 33 to the respective relays, send analyzed control signals for the throttling element (the electronic expansion valve) 431 to the step driving control unit 52 mentioned above, send analyzed control signals for the first regulating valve 432, the second regulating valve 433 and the third regulating valve 434 to the corresponding relays; or send analyzed control signals for the water inlet valve 111, the electric regulating valve 121, the outlet valve 311 to the respective step driving control unit 53, 54, 55.

The step driving control unit take charge of receiving the control signals used to control the throttling element coming from the central processing unit, and provide a current to a corresponding coil assembly corresponding to the throttling assembly, the current meet a demand of a control signal used to control the throttling device coming from the central processing unit, and the coil assembly of the throttling assembly controls the communication of the refrigerant in a refrigerant flow path between the outlet of the condenser and the evaporator.

The central processing unit 51 can further record and/or store current state information of the throttling assembly, specifically, the current state information may be current open degree information and/or current position information of the electronic expansion valve 31, current position information of the first, second and third regulating valves, or current open degree information and/or current position information of the water inlet valve 111, the electric regulating valve 121, and the outlet valve 311.

Figure 4:
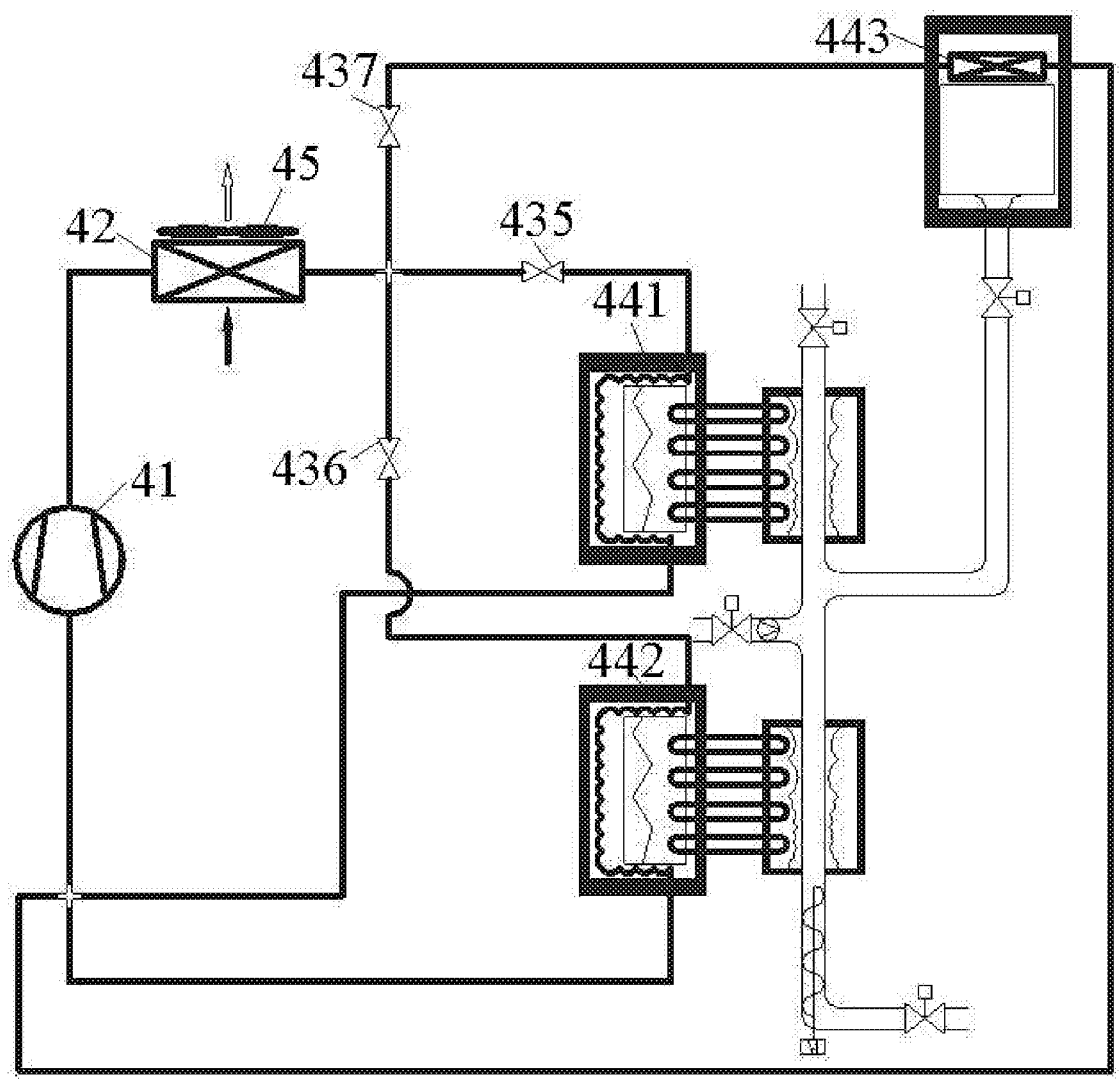
FIG. 4 is a schematic view of another system of a refrigerating device of the present disclosure.

In addition to the introductions above, the refrigeration system 4 may further have a mode shown in FIG. 4. As shown in FIG. 4, the refrigeration system 4 includes the compressor 41, the condenser 42, the first evaporator 441, the second evaporator 442, the third evaporator 443, the fan 45 disposed corresponding to the condenser 42, and the throttling assembly, in which the throttling assembly includes a first throttling element 435, a second throttling element 436, and a third the throttling element 437. An outlet of the compressor 41 is in communication with an inlet of the condenser 42, and an outlet of the condenser 42 is in communication with inlets of the first throttling element 435, the second throttling element 436 and the third throttling element 437. An outlet of the first throttling element 435 is in communication with an inlet of the first evaporator 441, an outlet of the second throttling element 436 is in communication with an inlet of the second evaporator 442, and an outlet of the third throttling element 437 is in communication with an inlet of the third evaporator 443. The first throttling element 435 can control a communication of the refrigerant between the outlet of the condenser 42 and the inlet of the first evaporator 441, the second throttling element 436 can control a communication of the refrigerant between the outlet of the condenser 42 and the inlet of the second evaporator 442, and the third throttling element 437 can control a communication of the refrigerant between the outlet of the condenser 42 and the inlet of the third evaporator 443.

The first throttling element 435 can throttle, reduce pressure, further turn on and turn off the communication of the refrigerant in a refrigerant flow path between the outlet of the condenser 42 and the inlet of the first evaporator 441, and furthermore regulate a flow quantity of the refrigerant. The second throttling element 436 can throttle, reduce pressure, further turn on and turn off the communication of the refrigerant in a refrigerant flow path between the outlet of the condenser 42 and the inlet of the second evaporator 443, and furthermore regulate a flow quantity of the refrigerant. The third throttling element 437 can throttle, reduce pressure, further turn on and turn off the communication of the refrigerant in a refrigerant flow path between the outlet of the condenser 42 and the inlet of the third evaporator 441, and furthermore regulate a flow quantity of the refrigerant. Specifically, the first throttling element, the second throttling element and the third throttling element can be configured as an electronic expansion valve having a closing function, or a capillary tube and a solenoid valve which are connected in series, or a thermal expansion valve and a solenoid valve which are connected in series. The electronic expansion valve has a closing function and a throttling function, and the solenoid valves has a full closing function, can receive a control signal provided by the control system 5 and realize specific respective regulation according to the control signal.

Figure 5:
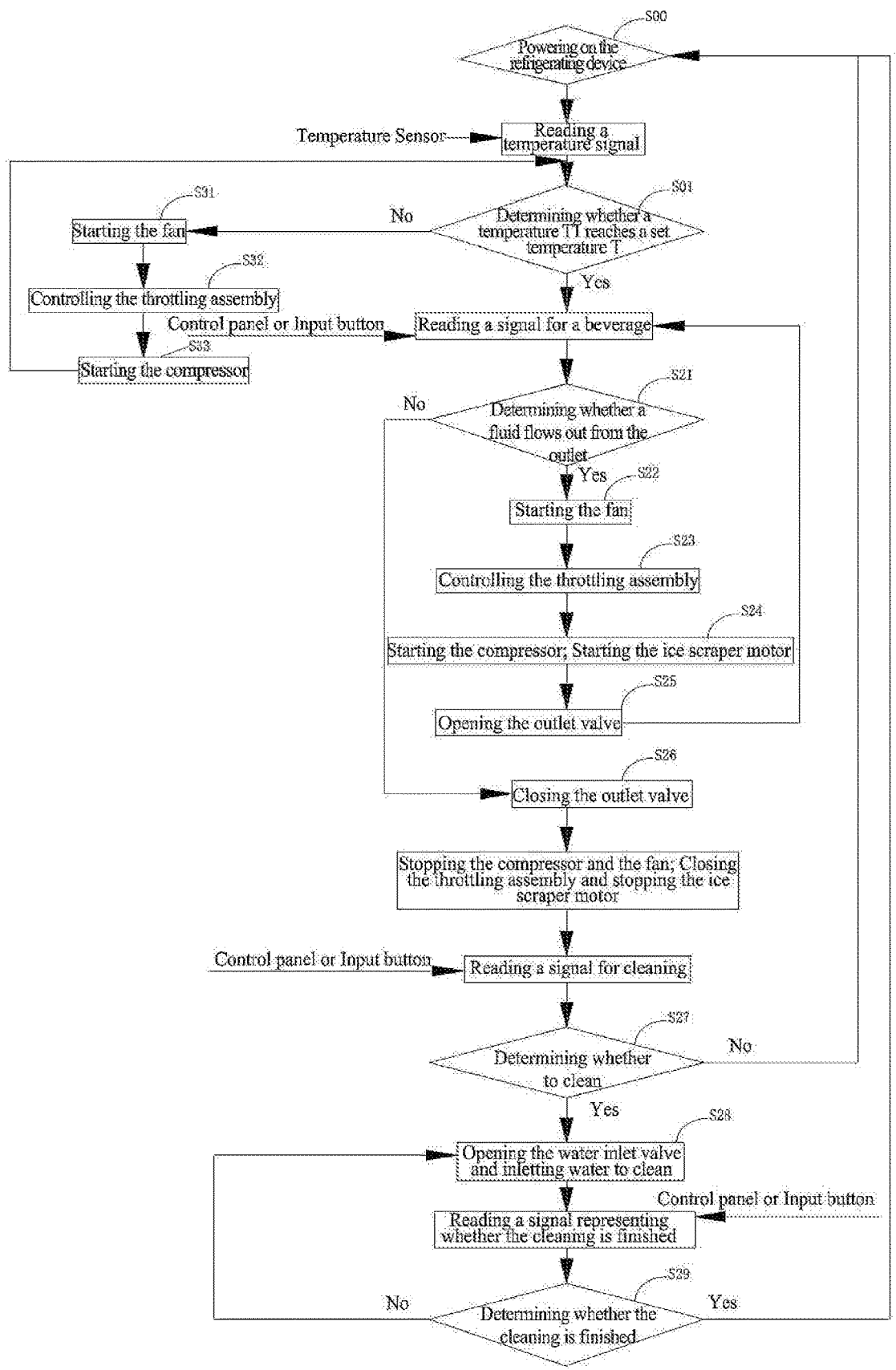
FIG. 5 is a flow diagram of a refrigerating device of the present disclosure.

As shown in FIG. 5, a control method for the refrigerating device is introduced in the following, specifically, the refrigerating device is controlled by means of a control unit, and the control method includes steps:

S00: powering on the refrigerating device;

S01: detecting whether a temperature of the first evaporator T1 arrives a preset temperature T via the temperature sensor, if yes and in a case of a drinking need exists, making the second evaporator operate to reduce a temperature of the raw material further to a preset goal temperature; and if no, making the first evaporator operate until the temperature T1 of the first evaporator meets the preset temperature condition.

The step S01 further includes the following conditions:

when the temperature T1 of the first evaporator arrives the preset temperature T and the drinking need exists, the throttling assembly is controlled by the control system to make the refrigerant flow path between the second evaporator and the outlet of the condenser turned on, while the refrigerant flow path between the inlet of the first evaporator and the outlet of the condenser is in a turn-off state;

when the temperature T1 of the first evaporator doesn't arrive the preset temperature T, the throttling assembly is controlled by the control system to make the refrigerant flow path between the first evaporator and the outlet of the condenser turned on, while the refrigerant flow path between the inlet of the second evaporator and the outlet of the condenser is in a turn-off state;

More specifically, the control method for the refrigerating device in the present embodiments is realized through the following steps:

S00: powering on the refrigerating device;

S01: detecting whether the temperature of the first evaporator T1 arrives the preset temperature T via the temperature sensor disposed to the first evaporator, if yes, performing step S21, if no, performing step S31;

S21: reading a signal for the drinking need through a control panel or an input button, determining whether there is a drinking need, if yes, performing step S22; if no, performing step S26;

S22: starting the fan, then performing step S23;

S23: controlling the throttling assembly to make the refrigerant flow path between the second evaporator and the outlet of the condenser turned on, and make the refrigerant flow path between the inlet of the first evaporator and the outlet of the condenser turned off; and then performing step S24;

S24: starting the compressor to reduce a temperature of the raw material and starting the electric motor of the ice scrapper at the same time; and then performing step S25;

S25: opening the outlet valve and regulating a flow quantity in a drinking liquid pipe according to a liquid target provided by a controller, and then performing step S21;

S26: closing the outlet valve, stopping the compressor and the fan, and closing the throttling assembly and the electric motor of the ice scrapper; and then performing step S27;

S27: determining whether to clean through the control panel or the input button, if yes, performing step S28; if no, powering off;

S28: opening the water inlet valve to make the water in and clean, and then performing step S29;

S29: determining whether the cleaning is finished through the control panel or the input button, if yes, closing the water inlet valve and powering off; if no, performing step S28;

S31: starting the fan, and then performing step S32;

S32: controlling the throttling assembly to make the refrigerant flow path between the first evaporator and the outlet of the condenser turned on, and make the refrigerant flow path between the inlet of the second evaporator and the outlet of the condenser turned off; and then performing step S33; and S33: starting the compressor to reduce a temperature of the raw material, and performing step S01 after operation for a period of time.

The temperature T1 is a value or a variation trend of the temperature, and the preset temperature T may be any value of temperature or a threshold value of temperature within a setting range.

In the above controlling method, the refrigerant flow path between the inlet of the third evaporator and the outlet of the condenser may be in a turn-off state or a turn-on state, which can be determined according to the actual conditions specifically.

Certainly, there may be a plurality of control methods for the refrigerating device of the present disclosure, in which the refrigerant flow path between the inlet of the first evaporator and the outlet of the condenser as well as the refrigerant flow path between the inlet of the second evaporator and the outlet of the condenser may be in a turn-on state at the same time.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial direction," "radium direction," and "circumferential direction" should be construed to refer to the orientation as then described or as shown in the drawings under discussion. These relative terms are for convenience of description and do not indicate or imply that the device or element be constructed or operated in a particular orientation, thus cannot be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature expressly or implicitly. In the description of the present disclosure, "a plurality of" means at least two, such as two or three, unless specified otherwise.

In the present disclosure, unless specified or limited otherwise, the terms "mounted," "connected," "in communication", "fixed" are used broadly, and may be, for example, fixed connections, detachable connections, or integral connections; may also be mechanical or electrical connections or be in communication with each other; may also be direct connections or indirect connections via intervening structures; may also be inner communications of two elements or interact relationships of two elements, which can be understood by those skilled in the art according to specific situations, unless specified or limited otherwise.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases above in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples can be united or combined without conflicting premise by those skilled in the related art.

Although embodiments of the present disclosure have been shown and described, it would be appreciated that the embodiments above are illustrative and cannot be construed to limit the present disclosure, and changes, variations, alternatives, and modifications can be made in the embodiments without departing from scope of the present disclosure by those skilled in the related art.

What is claimed is:

1. A refrigerating device used to prepare a frozen drink, comprising;
    a pre-refrigeration unit used to pre-refrigerating a raw material for preparing the frozen drink in the pre-refrigeration unit;
    a main-refrigeration unit in communication with the pre-refrigeration unit and used to accommodate the raw material after pre-refrigeration, wherein the pre-refrigerated raw material is refrigerated further in the main-refrigeration unit;
    a dispenser in communication with the main-refrigeration unit and used to dispense the frozen drink in the main-refrigeration unit; and
    a refrigeration system providing a refrigerating capacity to the pre-refrigeration unit and the main-refrigeration unit so as to pre-refrigerate the raw material in the pre-refrigeration unit and further refrigerate the pre-refrigerated raw material in the main-refrigeration unit to form the frozen drink,
    wherein the raw material is configured to be one of water, a dry power ingredient, a solution ingredient, a mixer of water and a dry power ingredient and a mixer of water and a solution ingredient, the pre-refrigeration unit comprises a water pre-refrigeration chamber and a preservation chamber used to storage the dry power ingredient and/or the solution ingredient, the main-refrigeration unit comprises a main-refrigeration chamber, and the water pre-refrigeration chamber and the preservation chamber are in communication with the main-refrigeration chamber via a pipe; the refrigeration system provides the refrigerating capacity to the water pre-refrigeration chamber, the preservation chamber and the main-refrigeration chamber respectively so as to pre-refrigerate the water in the water pre-refrigeration chamber, pre-refrigerate the dry power ingredient and/or the solution ingredient in the preservation chamber, and further refrigerate the pre-refrigerated water as well as the dry power ingredient and/or the solution ingredient in the main-refrigeration chamber;

the refrigeration system comprises a compressor, a condenser, a throttling element, a first evaporator used to provide a refrigerating capacity to the water pre-refrigeration chamber, a second evaporator used to provide a refrigerating capacity to the main-refrigeration chamber and a third evaporator used to provide a refrigerating capacity to the preservation chamber;

a first regulating valve is disposed between the throttling element and the first evaporator, a second regulating valve is disposed between the throttling element and the second evaporator, and a third regulating valve is disposed between the throttling element and the third evaporator; and the throttling element is configured as one of an electronic expansion valve, a thermostatic expansion valve or a capillary tube.

2. The refrigerating device according to claim 1, wherein at least one of the water pre-refrigeration chamber and the main-refrigeration chamber is constituted by a portion of a water inlet pipe used for supplying water.

3. The refrigerating device according to claim 1, wherein, a plurality of preservation chambers is provided, and various kinds of the dry power ingredient and/or the solution ingredient are pre-refrigerated in the plurality of preservation chambers respectively and correspondingly.

4. The refrigerating device according to claim 1, wherein a water inlet valve is disposed at a water inlet of the water pre-refrigeration chamber, an ingredient electric regulating valve is disposed at the pipe between the preservation chamber and the main-refrigeration chamber, and a frozen drink electric regulating valve is disposed at an outlet pipe between the dispenser and the main-refrigeration chamber.

5. The refrigerating device according to claim 4, wherein an ice scraper is disposed in the outlet pipe and used to scrap ice attached to an inner wall of the outlet pipe.

6. The refrigerating device according to claim 5, wherein the ice scraper comprises an impeller-agitator rotatably disposed in the outlet pipe and an electric motor used to drive the impeller-agitator.

7. The refrigerating device according to claim 1, further comprising an air intake device used to bring air into the main-refrigeration chamber, the air intake device comprises an air pump and an air communicating pipe in communication with the main-refrigeration chamber, and the air pump brings environmental air or an artificial air source into the main-refrigeration chamber via the air communicating pipe.

8. The refrigerating device according to claim 2, further comprising an air intake device used to bring air into the main-refrigeration chamber, the air intake device comprises an air pump and an air communicating pipe in communication with the main-refrigeration chamber, and the air pump brings environmental air or an artificial air source into the main-refrigeration chamber via the air communicating pipe.

* * * * *

UNITED STATES PATENT AND TRADEMARK OFFICE
CERTIFICATE OF CORRECTION

PATENT NO. : 10,712,087 B2
APPLICATION NO. : 15/360548
DATED : July 14, 2020
INVENTOR(S) : Kai Cui et al.

It is certified that error appears in the above-identified patent and that said Letters Patent is hereby corrected as shown below:

On the Title Page

Item (73) Assignee: delete "SANHU(HANGZHOU) MICRO" and insert therefor --SANHUA(HANGZHOU) MICRO--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*